(12) United States Patent
Lorca Hernando et al.

(10) Patent No.: US 10,778,499 B2
(45) Date of Patent: Sep. 15, 2020

(54) METHOD TO PROVIDE INCREASED ROBUSTNESS AGAINST NOISE AND INTERFERENCE IN WIRELESS COMMUNICATIONS, A TRANSMITTER AND COMPUTER PROGRAM PRODUCTS THEREOF

(71) Applicant: TELEFONICA, S.A., Madrid (ES)

(72) Inventors: Javier Lorca Hernando, Madrid (ES); Carlos González Sánchez, Madrid (ES)

(73) Assignee: Telefonica, S.A., Madrid (ES)

( * ) Notice: Subject to any disclaimer, the term of this patent is extended or adjusted under 35 U.S.C. 154(b) by 167 days.

(21) Appl. No.: 16/052,835

(22) Filed: Aug. 2, 2018

(65) Prior Publication Data
US 2019/0044672 A1   Feb. 7, 2019

(30) Foreign Application Priority Data

Aug. 4, 2017 (EP) ..................... 17382550

(51) Int. Cl.
H04L 27/36 (2006.01)
H04L 27/26 (2006.01)

(52) U.S. Cl.
CPC ........ H04L 27/366 (2013.01); H04L 27/2634 (2013.01)

(58) Field of Classification Search
CPC .......................... H04L 27/2634; H04L 27/366
See application file for complete search history.

(56) References Cited

U.S. PATENT DOCUMENTS

2010/0080312 A1* 4/2010 Moffatt ................. H04B 1/713
                                                                375/260

OTHER PUBLICATIONS

Joao Guerreiro et al., "CE-OFDM Schemes: Spectral Characterization and Optimum Performance", Wireless Pers Commun, 2017, pp. 2965-2982, vol. 96, DOI 10.1007/s11277-017-4333-x.

(Continued)

*Primary Examiner* — Kevin C. Harper
(74) *Attorney, Agent, or Firm* — Sughrue Mion, PLLC

(57) ABSTRACT

A method to provide robustness against noise and interference in wireless communications, a transmitter and computer program products, involving sending to a receiver (13), through a wireless channel (12), information using a constant-envelope waveform with complex baseband representation of the form $s[n]=A_c \exp\{j\phi[n]\}$. The phase $\phi[n]$ following the expression $$(\phi[n] - \phi[n-1]) = 2\pi m \cdot \sum_{k=k_0+1}^{k_0+N_{a,FM}^+ - 1} x[k]\exp\left(j\frac{2\pi k n}{N}\right),$$

and the wireless channel has an Additive White Gaussian Noise component and flat-fading conditions, wherein the transmitter (110) calculates a FFT length, N, and a number of active positive subcarriers, $N_{a,FM}^+$, needed in order to have a given improvement in the signal to noise ratio at the active positive subcarriers of the instantaneous frequency spectrum containing the information; calculates a cutoff subcarrier $k_0$ needed to overcome Doppler, phase noise and carrier frequency offset impairments at the receiver side, and generates a complex baseband signal waveform of the form $s[n]=A_c \exp\{j\phi[n]\}$ carrying information with the FFT length, number of active positive subcarriers and cutoff subcarrier.

10 Claims, 4 Drawing Sheets

(56) References Cited

OTHER PUBLICATIONS

Steve C. Thompson et al., "Constant Envelope OFDM", IEEE Transactions on Communications, Aug. 2008, pp. 1300-1312, vol. 56, No. 8.
Markku Kiviranta et al., "Constant Envelope Multicarrier Modulation: Performance Evaluation in AWGN and Fading Channels", Military Communications Conference, 2005, MILCOM 2005. IEEE Atlantic City, NJ, USA, Oct. 17-20, 2005, Piscataway, NJ, USA, IEEE, Piscataway, NJ, USA, Oct. 17, 2005, pp. 1-7, XP010901620.
M. Elghzaoui et al., "Analyses and performance of CE-OFDM in wireless Systems under Saleh-Valenzuela Channel", Science International, Mar. 31, 2014, XP055439562, Retrieved from the Internet:URL: http://wits2014.science-conferences.net/proceeding/Teleconimunications-1/69-M-ELGHZAOUI.pdf, pp. 1-5.
European Search Report and Written Opinion of EP 17 38 2550 dated Jan. 10, 2018.

\* cited by examiner

METHOD TO PROVIDE INCREASED ROBUSTNESS AGAINST NOISE AND INTERFERENCE IN WIRELESS COMMUNICATIONS, A TRANSMITTER AND COMPUTER PROGRAM PRODUCTS THEREOF

TECHNICAL FIELD

The present invention is directed, in general, to the field of wireless communications. In particular, the invention relates to a method to provide increased robustness against noise and interference in wireless communications characterized by significant additive Gaussian noise, high Doppler spread, phase noise, frequency mismatch, and/or low efficiency of the power amplifiers. The invention also relates to a transmitter and to computer program products.

In the present document, by cutoff subcarrier should be understood the subcarrier index above which the spectral components of the instantaneous frequency signal are mapped, in such a way that no significant Doppler, phase noise and/or CFO impairments are present at the received signal above it. By noise reduction factor it should be understood a term multiplying the subcarriers' SNR that accounts for the effective noise power experienced by the subcarriers of the instantaneous frequency signal, in presence of AWGN noise.

BACKGROUND OF THE INVENTION

Orthogonal Frequency Division Multiplexing (OFDM) is a proven access technique for efficient user and data multiplexing in the frequency domain. One example of a system employing OFDM is Long-Term Evolution (LTE). LTE is the next step in cellular Third-Generation (3G) systems, which basically represents an evolution of previous mobile communications standards such as Universal Mobile Telecommunication System (UMTS) and Global System for Mobile Communications (GSM). It is a Third Generation Partnership Project (3GPP) standard that provides throughputs up to 50 Mbps in uplink and up to 100 Mbps in downlink. It uses scalable bandwidth from 1.4 to 20 MHz in order to suit the needs of network operators that have different bandwidth allocations.

Recent standardization efforts in 3GPP towards 5G cellular systems also focus on OFDM for so-called New Radio (NR), including support to carrier frequencies up to 100 GHz. NR will support so-called Ultra-Reliable Low-Latency Communications (URLLC), characterized by high reliabilities and low latencies for critical applications such as emergencies, health, or even tactile Internet. Other wireless standards like WiFi (IEEE 802.11), WiMAX (IEEE 802.16) or Digital Video Broadcasting Terrestrial (DVB-T) also employ OFDM.

Among the disadvantages of OFDM, its sensitivity to Doppler, phase noise and frequency offset, as well as its large peak-to-average power ratio (PAPR), are among the hardest challenges to overcome. Large PAPR signals lead to low efficiency of the power amplifiers (PAs), because the PA operating point should be designed well within the linear region hence requiring large back-off values (usually higher than 10 dB, unless clipping techniques are applied). This drawback is aggravated at high frequencies because of the inherently lower power efficiency of radio frequency (RF) hardware above 6 GHz. Sensitivity to frequency misalignments is also critical at high frequencies, as well as the Doppler spread caused by movements of the user and/or the environment, both of them linearly increasing with the carrier frequency. Finally, phase noise introduced by RF oscillators is another issue that can be very significant beyond 6 GHz, hence introducing non-additive impairments at the receiver side that, except for the so-called common phase error (CPE), can be very difficult to overcome.

There is a large body of research studying alternatives to OFDM aimed at overcoming some of the above limitations. In [1], the authors propose a constant-envelope waveform based on modulating the instantaneous frequency of the carrier signal with an OFDM modulating signal. Such waveform is seen to be particularly robust to multipath, phase noise and frequency offsets, but additional robustness to Additive White Gaussian Noise (AWGN) is not yet studied. Critical communications must often ensure very high reliability at the air interface even in low signal-to-noise ratio conditions, hence demanding specialized techniques to overcome noise and interference without compromising performance.

3GPP has also proposed suitable modifications to existing OFDM-based waveforms in so-called NB-IoT (Narrowband IoT) and LTE-M air interfaces, with the goal of improving coverage and addressing traditionally challenging scenarios (like deep indoor environments). However, these air interface variants do not offer good protection against Doppler, phase noise or frequency offsets. Both NB-IoT and LTE-M are based on OFDM waveform hence suffering from the same limitations as to the impact of frequency offset, phase noise and Doppler on performance.

Ongoing standardization of NR in 3GPP is focusing on so-called Phase Tracking Reference Signals (PTRS), aimed at compensating the impact of CPE in OFDM waveforms. Non-constant phase errors are, however, generally not possible to compensate by means of reference signals, and subcarriers are assumed to be wide enough (as per the scalable numerology in NR) so as to make phase noise less harmful. Too wide a subcarrier spacing, however, may lead to non-flat channel conditions at the subcarriers, hence demanding intra-subcarrier equalization in frequency-selective channels, with the subsequent complexity.

In summary, current state of the art cannot provide improved reliability and simultaneous protection against Doppler, phase noise and frequency instability with standard waveforms. More adequate waveforms are therefore required in order to provide sufficient robustness to those impairments, while also overcoming the impact of low power efficiency at the PA.

DESCRIPTION OF THE INVENTION

To that end, the present invention proposes according to a first aspect a method to provide increased robustness against noise and interference in wireless communications, the method comprising as commonly in the field the sending, by a transmitter, to a receiver, through a wireless channel, information using a constant-envelope waveform with complex baseband representation of the form $s[n]=A_c \exp\{j\phi[n]\}$, denoted as FM-OFDM waveform, said phase $\phi[n]$ following the expression $$(\phi[n] - \phi[n-1]) = 2\pi m \cdot \sum_{k=k_0+1}^{k_0+N_{a,FM}^+ -1} x[k] \exp\left(j\frac{2\pi kn}{N}\right),$$

where N is the FFT length, $k_0$ is a cutoff subcarrier above which the information x[k] is mapped, $N_{a,FM}^+$ is the number of active positive subcarriers, and $A_c$ and m are real constants, aimed at protecting the information against noise, Doppler, phase noise and carrier frequency offset impairments.

According to the proposed method, said wireless channel has an Additive White Gaussian Noise component and flat-fading conditions, i.e. at most one multipath component is present at the receiver side (apart from Gaussian noise). This can be realistic when the receiver is capable of spatially discriminating those signal components that are not received within a narrow beam width, as is characteristic of beamforming in higher frequencies.

Unlike the known proposals in the field, in the proposed method the transmitter calculates the FFT length, N, and the number of active positive subcarriers, $N_{a,FM}^+$, that are needed in order to have a given improvement in the signal to noise ratio at the active positive subcarriers of the instantaneous frequency spectrum containing the information; calculates the cutoff subcarrier $k_0$ that is needed to overcome Doppler, phase noise and carrier frequency offset impairments at the receiver side; and generates a complex baseband signal waveform of the form $s[n]=A_c \exp\{j\, \phi[n]\}$ carrying the desired information with the chosen FFT length, number of active positive subcarriers and cutoff subcarrier.

In an embodiment, the signal to noise ratio at the active positive subcarriers of the instantaneous frequency spectrum, when taking into account phase unwrap errors, $SNR_{sc,freq,FM}^{unwrap}$, follows the expression:

$$(SNR_{sc,freq,FM}^{unwrap})^{-1} = (SNR_{sc,freq,FM})^{-1} + \frac{P[\text{unwrap}]}{m_{norm}^2 E\left[\frac{1}{|x[n]|_{max}^2}\right]},$$

where the signal to noise ratio at the active positive subcarriers of the instantaneous frequency spectrum disregarding phase unwrap errors, $SNR_{sc,freq,FM}$, is given by:

$$SNR_{sc,freq,FM} = 2\pi^2 m_{norm}^2 \frac{E\left[\frac{1}{|x[n]|_{max}^2}\right]}{E\left[\arctan^2 \frac{n_{0,\theta}[n]}{A_c[n]+n_{0,r}[n]}\right]} \frac{1}{\eta(N_{a,FM}^+)},$$

$$\eta(N_{a,FM}^+) = \frac{1}{N_{a,FM}^+} \sum_{k=k_0+1}^{k_0+N_{a,FM}^+} \left(1-\cos\left(\frac{2\pi k}{N}\right)\right),$$

where $n_{0,r}[n]$ and $n_{0,\theta}[n]$ are additive White Gaussian noise components along radial and normal directions with respect to a phasor representing the received FM-OFDM signal, according to the expression:

$$r[n]=(A_c[n]+n_{0,r}[n])\hat{u}_r + n_{0,\theta}[n]\hat{u}_\theta,$$

where $r[n]$ is the complex baseband representation of the received FM-OFDM signal; $\hat{u}_r$, $\hat{u}_\theta$ are unitary phasors in the complex plane following radial and normal directions respectively; $A_c[n]$ is the received amplitude of the FM-OFDM signal; $m_{norm}$ is the modulation index of the FM-OFDM signal; and $P[\text{unwrap}]$ is the probability that a phase unwrap error occurs at any instantaneous sample of the received FM-OFDM symbol.

The two expected value operators can be calculated numerically or by simulation. The expected value in the numerator $$E\left[\frac{1}{|x[n]|_{max}^2}\right]$$

can be obtained by simulation as a function of $N_{a,FM}^+$ and the modulation order of the subcarriers in the instantaneous frequency, by simply obtaining the average of the term in brackets after a sufficiently high number of transmitted OFDM symbols with random subcarrier amplitudes $x[k]$.

In an embodiment, the expected value in the denominator $$E\left[\arctan^2 \frac{n_{0,\theta}[n]}{A_c[n]+n_{0,r}[n]}\right]$$

can be calculated as a function of the symbol signal-to-noise ratio, $$SNR_{simb,FM} = \frac{A_c^2}{N_0 B},$$

in presence of Additive White Gaussian Noise with no Rayleigh fading impairments, using the expression:

$$E\left[\arctan^2 \frac{n_{0,\theta}[n]}{A_c[n]+n_{0,r}[n]}\right] == $$

$$\frac{1}{\pi N_0 B} \int\int \arctan^2 \frac{n_{0,\theta}}{A_c+n_{0,r}} \exp\left(-\frac{n_{0,\theta}^2}{N_0 B}\right)\exp\left(-\frac{n_{0,r}^2}{N_0 B}\right) dn_{0,\theta} dn_{0,r},$$

where $N_0$ is the noise power spectral density and B is the signal bandwidth.

In another embodiment, said magnitude in the denominator $$E\left[\arctan^2 \frac{n_{0,\theta}[n]}{A_c[n]+n_{0,r}[n]}\right]$$

can be calculated as a function of the symbol signal-to-noise ratio, $$SNR_{simb,FM} = \frac{A_c^2}{N_0 B},$$

in presence of a flat fading Rayleigh channel using the expression:

$$E\left[\arctan^2 \frac{n_{0,\theta}[n]}{A_c[n]+n_{0,r}[n]}\right] == $$

$$\frac{1}{\pi N_0 B \sigma^2} \int\int\int \arctan^2 \frac{n_{0,\theta}}{A_c+n_{0,r}} \exp\left(-\frac{n_{0,\theta}^2}{N_0 B}\right)$$

$$\exp\left(-\frac{n_{0,r}^2}{N_0 B}\right) A_c \exp\left(-\frac{A_c^2}{2\sigma^2}\right) dn_{0,\theta} dn_{0,r} dA_c,$$

where $\sigma^2$ is the average received power of the signal's amplitude $A_c[n]$.

The above integrals can in turn be determined by means of either numerical integration or Monte Carlo simulations.

The term $\eta(N_{a,FM}^+)$ is a noise reduction factor that depends only on the number of active subcarriers $N_{a,FM}^+$ and the cutoff subcarrier $k_0$. It is thus possible to calculate the maximum number of active subcarriers in the instantaneous frequency in such a way that a given SNR can be achieved. The lower the number of active subcarriers, and the closer they are to the cutoff subcarrier, the better the protection against noise. Enhanced noise robustness leads to better bit error rate characteristics and hence better reliability as required in URLLC.

In an embodiment, the probability of phase unwrap errors, P[unwrap], is expressed as the probability that the absolute magnitude of the received instantaneous frequency signal exceeds 0.5:

$$P[\text{unwrap}] = P[|f + \Delta f| \geq 0.5],$$

where f is the instantaneous frequency signal ideally received without noise, and $\Delta f$ is the corresponding noise component.

In another embodiment, said probability of phase unwrap errors is calculated by:

$$P[\text{unwrap}] = \int_{0.5}^{1} [p_f(f) * p_{\Delta f}(f)] df + \int_{-1}^{-0.5} [p_f(f) * p_{\Delta f}(f)] df,$$

where $p_{\Delta f}(\cdot)$ denotes the probability density function, pdf, of the instantaneous frequency noise component $\Delta f$, and $p_f(\cdot)$ denotes the pdf of the instantaneous frequency signal f ideally received without noise, according to the expression:

$$f[n] = \frac{m_{norm}}{|x[n]|_{max}} \cdot \frac{1}{\sqrt{N}} \sum_{k=0}^{N-1} x[k] \exp\left(j\frac{2\pi k n}{N}\right), n = 0, \ldots, N-1,$$

where x[k] are the subcarriers' complex amplitudes containing the information; $m_{norm}$ is the modulation index; and $|x[n]|_{max}$ is the peak absolute amplitude of the constituent OFDM signal x[n] containing the information.

Moreover, said pdf of the instantaneous frequency noise component $p_{\Delta f}(\cdot)$ can be calculated as the pdf of a transformation of the random processes $n_{0,r}[n]$, $n_{0,\theta}[n]$, and $A_c[n]$, according to the expression:

$$\Delta f[n] = \frac{1}{2\pi}\left[\arctan\frac{n_{0,\theta}[n]}{A_c[n] + n_{0,r}[n]} - \arctan\frac{n_{0,\theta}[n-1]}{A_c[n-1] + n_{0,r}[n-1]}\right].$$

Other aspects that are disclosed herein also include a transmitter including a waveform generation unit, configured for implementing the method of the first aspect of the invention.

Even, other aspects of the present invention include software programs to perform the method, embodiment steps and operations summarized above and disclosed in detail below. More particularly, a computer program product is one embodiment that has a computer-readable medium including computer program instructions encoded thereon that when executed on at least one processor in a computer element causes the processor to perform the operations indicated herein as embodiments of the invention.

Therefore, present invention leverages the waveform proposed in [1] by proposing a method to generate an FM-OFDM waveform with extra desired robustness to noise and interference, specified by means of an SNR gain over OFDM, for a given modulation order. Provided that flat fading conditions are fulfilled, the present proposal describes a method to provide additional protection against noise in terms of an SNR gain, by using a constant-envelope signal described in prior art whose instantaneous frequency signal carries the payload information.

Such waveform can be designed so as to trade off data rate against robustness to noise, by selecting the number of active subcarriers in the instantaneous frequency spectrum that yields a desired protection against noise.

The described procedure preserves the already described robustness of such waveform against Doppler, phase noise and CFO impairments, by selecting the appropriate value of the cutoff subcarrier.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF PREFERRED EMBODIMENTS

Figure 1:
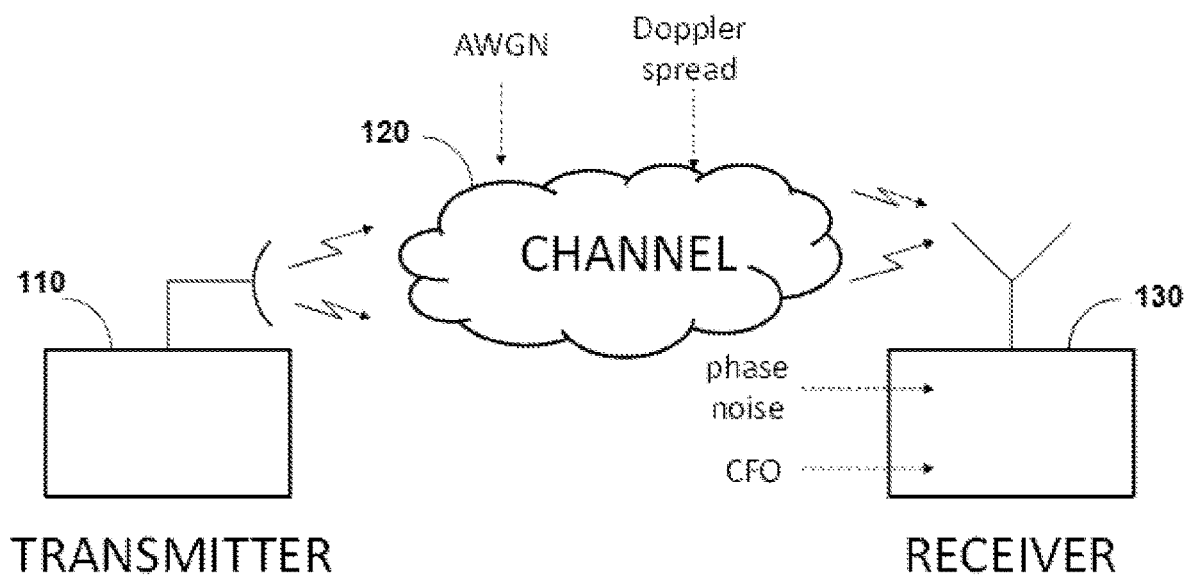
FIG. 1 is a schematic illustration of a system for application of the proposed invention.

With reference to FIG. 1, therein it is illustrated a basic system for applicability of the proposed method in order to improve reliability of FM-OFDM waveforms. The system comprises a non-ideal wireless transmitter (110), a non-ideal channel (120) introducing a number of impairments on a wireless signal, and a non-ideal wireless receiver (130) also introducing further impairments. Signal impairments at the receiver (130) can comprise one or multiple sources of AWGN, Doppler spread, phase noise and/or carrier frequency offset (CFO).

The wireless system is designed so as to deliver a data packet within a given time with very high probability of success, as per so-called URLLC use cases. This requires significantly improved BER/BLER performance curves compared to prior art techniques, even in presence of impairments caused by both the channel (120) and the receiver's (130) implementation.

Present invention assumes that the received signal is not subject to multipath, but to a combination of AWGN, Doppler, phase noise, and carrier frequency offset. This is sometimes referred to as flat fading conditions, and can be realistic in environments where beamforming at the receive side (130) is able to reject most of the multipath components outside the receiver's beam width. Beamforming allows assuming the presence of a single replica of the transmitted signal at the receiver (130) with very good approximation, further corrupted by a combination of AWGN, Doppler, phase noise and CFO. Beamforming at carrier frequencies above 6 GHz is deemed essential because of the excess propagation losses compared to lower frequencies, particularly above 30 GHz (officially called millimeter waves, or mm-waves). Bands above 6 GHz are commonly referred to as mm-waves, in contrast with lower cellular frequencies ranging from very few hundreds of MHz up to 6 GHz.

Robustness of the FM-OFDM waveform to Doppler, phase noise and CFO impairments has been described in the prior art [1]. However, no considerations are made on how to provide additional protection against Gaussian noise, which is deemed essential for URLLC and constitutes the basis of the present invention.

Let's first write the expression of a constant-envelope FM-OFDM signal after passing through an AWGN channel, with no other added impairments:

$$r[n] = A_c \exp j\phi[n] + n_0[n],$$

where the baseband signal power is given by $A_c^2$ and the baseband noise power is $N_0 B$, B denoting the signal bandwidth. $n_0[n] = n_{0,x}[n] + j n_{0,y}[n]$ is a complex circular white Gaussian Noise process whose real and imaginary parts are also white and Gaussian, with equal powers given by $N_0 B/2$.

Figure 2:
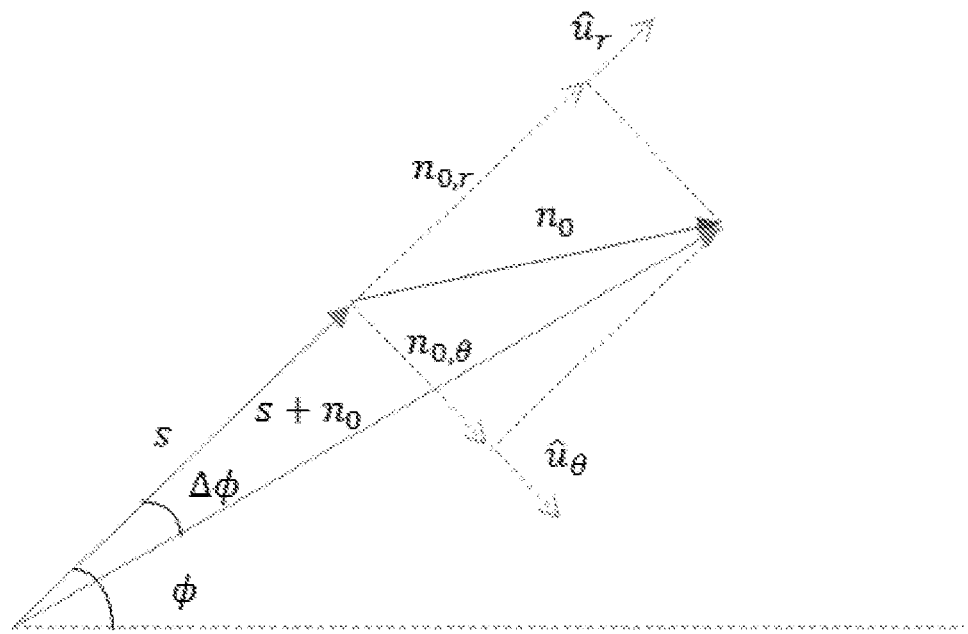
FIG. 2 illustrates the decomposition of the received signal into radial and normal components, and of the resulting phase error.

The received signal can also be written, after further decomposing the noise into orthogonal components as per $n_0[n] = n_{0,r}[n] \hat{u}_r + n_{0,\theta}[n] \hat{u}_\theta$, as: $r[n] = (A_c + n_{0,r}[n]) \hat{u}_r + n_{0,\theta}[n] \hat{u}_\theta$, where $\hat{u}_r$, $\hat{u}_\theta$ are unitary phasors in the complex plane following radial and normal directions respectively, and $\hat{u}_r$ presents an angle given by $\phi[n]$ with respect to the real and positive semi-axis. $n_{0,r}[n]$, $n_{0,\theta}[n]$ are the radial and normal noise components respectively. Both are assumed to be white Gaussian processes with equal powers given by $N_0 B/2$. FIG. 2 illustrates the above concepts together with the phase error introduced as a result of AWGN.

According to FIG. 2, the noise introduced on the phase of the received signal $\phi[n]$ is:

$$\Delta\phi[n] = \arctan \frac{n_{0,\theta}[n]}{A_c + n_{0,r}[n]}.$$

It is apparent that AWGN alters the phase in the form of a non-Gaussian noise component, according to a non-trivial function of both the signal and the noise amplitudes. The noise introduced over the instantaneous frequency signal is therefore:

$$\Delta f[n] \equiv \frac{1}{2\pi} \nabla(\Delta\phi[n]) = \frac{1}{2\pi}\left[\arctan\frac{n_{0,\theta}[n]}{A_c + n_{0,r}[n]} - \arctan\frac{n_{0,\theta}[n-1]}{A_c + n_{0,r}[n-1]}\right].$$

The presence of two consecutive time instants in the above expression suggests that noise in the instantaneous frequency signal is not white, because the autocorrelation function is non-zero for time differences equal to ±1:

$$R_{\Delta f}[1] = E[\Delta f[n] \cdot \Delta f[n+1]]$$

$$= \frac{1}{4\pi^2} E[\arctan n_0'[n]\arctan n_0'[n+1] - \arctan n_0'[n-1]$$

$$\arctan n_0'[n+1] - \arctan^2 n_0'[n] + \arctan n_0'[n-1]\arctan n_0'[n]],$$

where by convenience the magnitude $n_0'[n]$ is defined as:

$$n_0'[n] \equiv \frac{n_{0,\theta}[n]}{A_c + n_{0,r}[n]}.$$

Given that arctan is an odd function of its argument, and that $n_0'[n]$ takes symmetrically distributed values around 0, all the cross-products in the autocorrelation function are zero:

$$E[\arctan n_0'[n] \arctan n_0'[m]] = 0, \forall n \neq m$$

and, therefore:

$$R_{\Delta f}[1] = -\frac{1}{4\pi^2} E[\arctan^2 n_0'[n]] \neq 0.$$

As a result, noise in the instantaneous frequency is not white (nor Gaussian). Even symmetry of the autocorrelation function for wide-sense stationary real processes leads to the same result for a time difference equal to −1.

Figure 3:
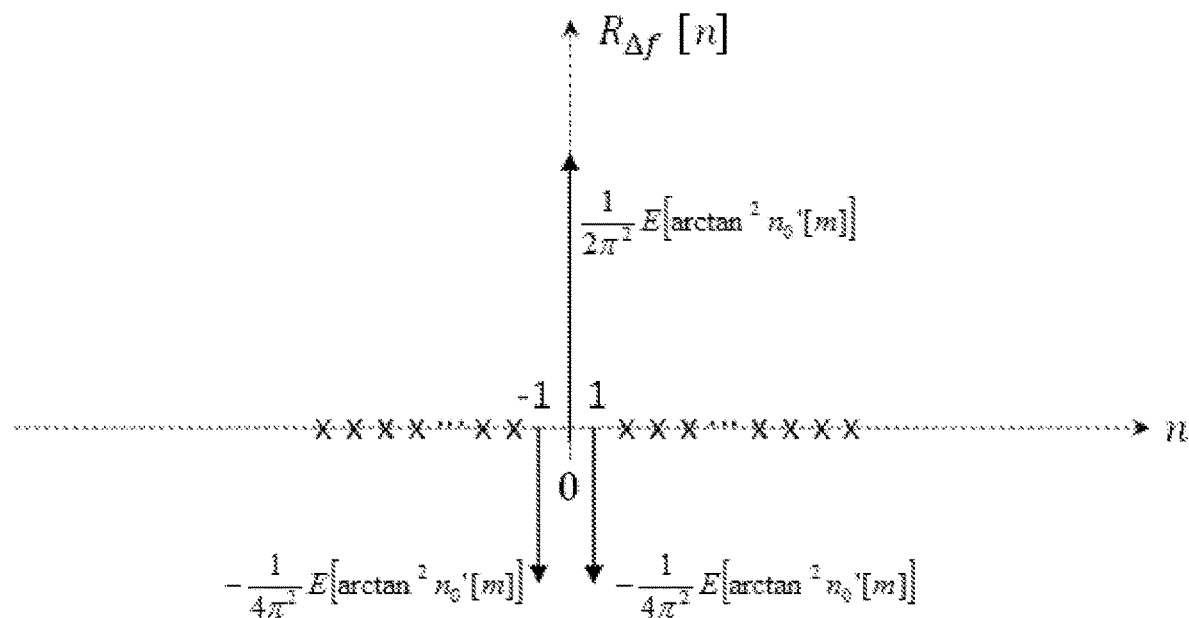
FIG. 3 illustrates the autocorrelation function of noise in the instantaneous frequency.

The autocorrelation function is however zero for all time instants beyond ±1. FIG. 3 illustrates the results after calculating it for different time instants, as per the following expressions (where index n within the expectation operators is replaced by m to avoid confusion):

$$R_{\Delta f}[0] = \frac{1}{2\pi^2} E[\arctan^2 n_0'[m]]$$

$$R_{\Delta f}[\pm 1] = -\frac{1}{4\pi^2} E[\arctan^2 n_0'[m]]$$

$$R_{\Delta f}[n] = 0, \forall n \neq 0, +1, -1$$

This expression has important implications on performance. The power spectrum of the noise in the instantaneous frequency is given by the Discrete Fourier Transform (DFT) of the autocorrelation function. Taking into account that signals are implicitly periodic (with period N) when dealing with DFTs, a more proper description for the autocorrelation function in the interval [0, N−1] can be given by:

$$R_{\Delta f}[n] = \begin{cases} \frac{1}{2\pi^2} E[\arctan^2 n_0'[m]], & n = 0 \\ -\frac{1}{4\pi^2} E[\arctan^2 n_0'[m]], & n = 1, N-1 \\ 0, & n \neq 0, 1, N-1 \end{cases}$$

The noise power spectrum in the instantaneous frequency is therefore:

$$S_{\Delta f}[k] = \frac{E[\arctan^2 n_0'[m]]}{2\pi^2}\left\{1 - \cos\left(\frac{2\pi k}{N}\right)\right\}, k = 0, 1, \ldots, N-1.$$

Figure 4:
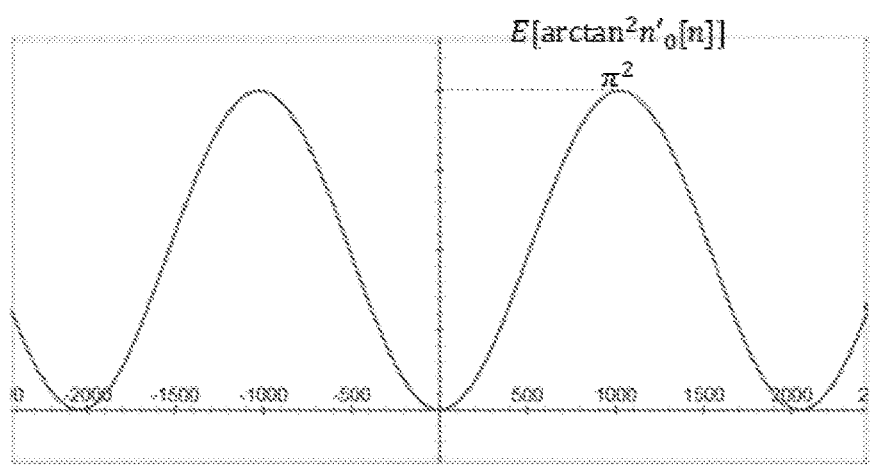
FIG. 4 illustrates the theoretical noise power spectrum in the instantaneous frequency, with N=2048.
Figure 5:
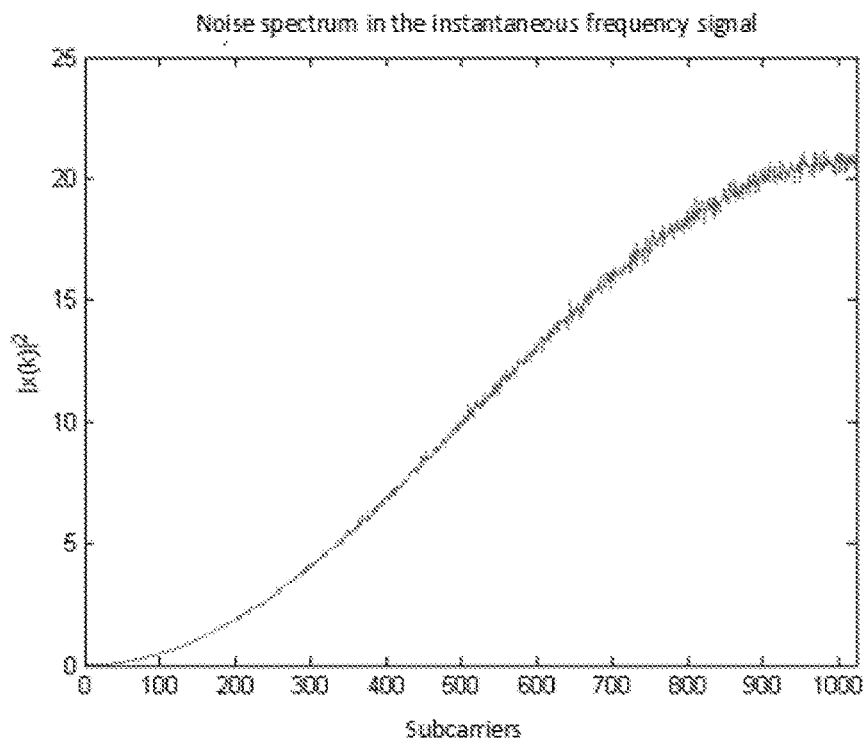
FIG. 5 illustrates the noise power spectrum obtained by simulation for a symbol SNR equal to 0 dB, as a function of the subcarrier index.

The noise power spectrum has a maximum at N/2 with a value that depends on the symbol SNR, as per the expected value of the term in brackets, with a zero at the origin (FIG. 4). Subcarriers close to the origin will therefore suffer from lower noise than those closer to N/2, and by concentrating the payload information at the former part of the spectrum it is possible to minimize the impact of noise. FIG. 5 shows the noise power spectrum as obtained by link-level simulations for SNR=0 dB (with arbitrary units in the vertical axis), where the cosine spectral shape is apparent. The value of $E[\arctan^2 n_0'[m]]$ can be obtained by means of Monte Carlo or numerical integration, as a function of the symbol SNR which, for AWGN channels, takes the value:

$$SNR_{simb,FM} = \frac{A_c^2}{N_0 B}.$$

Theoretical SNR in FM-OFDM Waveform Neglecting Phase Unwrap Errors

The instantaneous frequency signal at the receiver (130) can be written as:

$$\frac{1}{2\pi}\nabla\Phi[n] = \underbrace{f[n]}_{signal} + \underbrace{\Delta f[n]}_{noise}.$$

The leftmost term contains the payload information carried by the subcarriers, with amplitudes given by x[k] as per the following expression:

$$f[n] = \frac{m_{norm}}{|x[n]|_{max}} \cdot \frac{1}{\sqrt{N}} \sum_{k=0}^{N-1} x[k]\exp\left(j\frac{2\pi k n}{N}\right), n = 0, \ldots, N-1.$$

$|x[n]|_{max}$ is the absolute peak value of x[n] within the symbol (which changes on a per-symbol basis depending on the subcarriers contents), and $m_{norm}$ is a normalization constant. This procedure enforces the instantaneous frequency to be always in the range $[-m_{norm}, m_{norm}]$ hence limiting the maximum instantaneous bandwidth of the signal (which depends on the maximum frequency excursion). $m_{norm}$ can be regarded as a modulation index similar to that in analogue FM signals. It should be preferably chosen so as not to exceed a given maximum bandwidth, with a hard limit given by 0.5 to avoid phase changes beyond the interval $[-\pi,\pi]$ between two consecutive time instants (which would cause ambiguities in the unwrap step at the receiver [1]).

Approximate analysis of the bandwidth in phase-modulated signals [2] yields a 90% bandwidth given by: $BW \cong 2(|\Delta f_{max}|+B)$, where $|\Delta f_{max}|$ denotes the maximum frequency excursion, and B is the baseband bandwidth of the modulating signal. In FM-OFDM, $|\Delta f_{max}|=m_{norm}$ and B represents the highest frequency contents in the instantaneous frequency spectrum. The number of active positive subcarriers (active subcarriers in the positive half of the spectrum), denoted by $N_{a,FM}^+ = N_{a,FM}/2$, determines the value of B. Hence the following expression can be obtained:

$$BW_{FM-OFDM} \cong 2\left(m_{norm} + \frac{N_{a,FM}^+ + k_0}{N}\right).$$

The bandwidth is given in normalized units between 0 and 1, as per the usual convention in Discrete Fourier Transforms, hence the term N in the denominator.

Assuming that the average power of the subcarriers x[k] is equal to one (as is usual in modulation mapping techniques, like QPSK or M-QAM), the power of the active subcarriers in the instantaneous frequency spectrum, $S_{sc,freq,FM}$ will be given by:

$$S_{sc,freq,FM} = m_{norm}^2 E\left[\frac{1}{|x[n]|_{max}^2}\right].$$

The higher the peak signal power $|x[n]|_{max}^2$, the lower the value of $S_{sc,freq,FM}$. It is therefore convenient to minimize $|x[n]|_{max}^2$ by means of e.g. a scrambling operation applied to the payload x[k] (in order to randomize the subcarriers' contents), or an additional DFT that can also reduce the peak-to-average signal power.

The noise power in the instantaneous frequency spectrum takes the value:

$$N_{freq,FM} = \frac{1}{2\pi^2}E\left[\arctan^2\frac{n_{0,\theta}[n]}{A_c + n_{0,\theta}[n]}\right].$$

As shown before, this power is not uniformly distributed in the spectrum of the instantaneous frequency, but the noise power experienced by the subcarriers will follow the shape of the noise power spectrum $S_{\Delta f}[k]$:

$$N_{sc,freq,FM}[k] = \frac{1}{2\pi^2}E\left[\arctan^2\frac{n_{0,\theta}[n]}{A_c + n_{0,r}[n]}\right]\left(1 - \cos\left(\frac{2\pi k}{N}\right)\right),$$

$$k = 0, \ldots, N-1,$$

The average noise power calculated over the positive active subcarriers that contain the information is given by:

$$N_{sc,freq,FM} = \frac{1}{2\pi^2}E\left[\arctan^2\frac{n_{0,\theta}[n]}{A_c + n_{0,r}[n]}\right]\eta(N_{a,FM}^+),$$

where a noise reduction factor has been defined over the $N_{a,FM}^+$ active positive subcarriers (noise in the negative subcarriers is identical by virtue of the spectrum hermiticity). By skipping the first $k_0$ subcarriers that were reserved to overcome Doppler, it can be written:

$$\eta(N_{a,FM}^+) \equiv \frac{1}{N_{a,FM}^+}\sum_{k=k_0+1}^{k_0+N_{a,FM}^+}\left(1 - \cos\left(\frac{2\pi k}{N}\right)\right).$$

For AWGN channels with sufficiently high SNR values the arctan function can be approximated by its argument, as well as neglect the radial noise component $n_{0,r}$ when compared to the signal amplitude $A_c$, therefore:

$$N_{sc,freq,FM} \cong \frac{1}{2\pi^2}E\left[\left(\frac{n_{0,\theta}[n]}{A_c}\right)^2\right]\eta(N_{a,FM}^+) = \frac{N_0 B}{4\pi^2 A_c^2}\eta(N_{a,FM}^+).$$

It is to note that the noise power depends on the signal power through $A_c$.

The subcarrier SNR in the instantaneous frequency spectrum is therefore:

$$SNR_{sc,freq,FM} \equiv \frac{S_{sc,freq,FM}}{N_{sc,freq,FM}} = 2\pi^2 m_{norm}^2 \frac{E\left[\frac{1}{|x[n]|_{max}^2}\right]}{E\left[\arctan^2 \frac{n_{0,\theta}[n]}{A_c + n_{0,r}[n]}\right]} \frac{1}{\eta(N_{a,FM}^+)}.$$

The term $$E\left[\arctan^2 \frac{n_{0,\theta}[n]}{A_c + n_{0,r}[n]}\right]$$

can be obtained using Monte Carlo or numerical integration techniques, assuming that $A_c$ is constant in AWGN channels, by means of the expression:

$$E\left[\arctan^2 \frac{n_{0,\theta}[n]}{A_c + n_{0,r}[n]}\right] = \int\int \arctan^2 \frac{n_{0,\theta}}{A_c + n_{0,r}} f_{n_{0,\theta}}(n_{0,\theta})$$

$$f_{n_{0,r}}(n_{0,r}) dn_{0,\theta} dn_{0,r}$$

$$= \frac{1}{\pi N_0 B} \int\int \arctan^2 \frac{n_{0,\theta}}{A_c + n_{0,r}} \exp\left(-\frac{n_{0,\theta}^2}{N_0 B}\right)$$

$$\exp\left(-\frac{n_{0,r}^2}{N_0 B}\right) dn_{0,\theta} dn_{0,r}.$$

The term $$E\left[\frac{1}{|x[n]|_{max}^2}\right]$$

can be obtained by simulation as a function of $N_{a,FM}^+$ and the modulation order of the subcarriers in the instantaneous frequency, by simply obtaining the average of the term in brackets after a sufficiently high number of transmitted OFDM symbols with random subcarrier amplitudes x[k].

Figure 6:
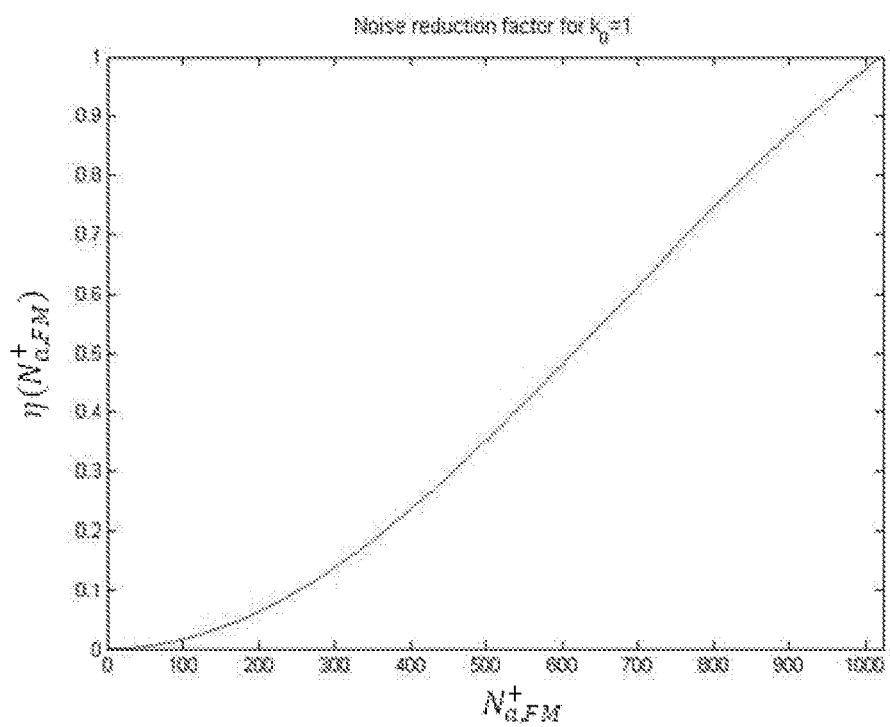
FIG. 6 illustrates the noise reduction factor as a function of the number of positive active subcarriers, for $k_0=1$.

The term $\pi(N_{a,FM}^+)$ provides additional robustness against noise for lower values of $N_{a,FM}^+$, as illustrated in FIG. 6. The above expression allows to determine the number of active subcarriers required to yield a desired SNR gain over the OFDM case, for a given modulation order.

It is important to note that the FFT length N must be high enough (e.g. 2048 or a similar value), because good protection can only be achieved at the lowest part of the spectrum. If the actual number of active subcarriers $N_{a,FM}^+$ is small, the occupied bandwidth will also be small but both N and the sampling frequency should be high enough to allow working in the low-noise region of the instantaneous frequency spectrum. For a given value of $N_{a,FM}^+$, which in turn determines the maximum bitrate, it is apparent that the higher the value of N, the better the performance.

For sufficiently high SNR the following expression can be obtained:

$$SNR_{sc,freq,FM} \cong 4\pi^2 m_{norm}^2 E\left[\frac{1}{|x[n]|_{max}^2}\right] \frac{1}{\eta(N_{a,FM}^+)} SNR_{simb,FM}.$$

SNR improves with the modulation index $m_{norm}$, although the latter is limited by design from the maximum allowed signal bandwidth. However SNR can significantly improve by reducing the number of active subcarriers through $\eta(N_{a,FM}^+)$. This should be chosen as a trade-off between data rate and the noise rejection capabilities of the designed waveform.

By way of comparison, the subcarrier SNR in OFDM for AWGN channels, assuming $A_c$ as the subcarrier amplitude, is given by:

$$SNR_{sc,OFDM} = \frac{A_c^2}{N_0 B} = SNR_{simb,FM}.$$

Therefore, the relation between the subcarrier SNR in FM-OFDM and OFDM at high SNR can be given by:

$$SNR_{sc,freq,FM} \cong 4\pi^2 m_{norm}^2 E\left[\frac{1}{|x[n]|_{max}^2}\right] \frac{1}{\eta(N_{a,FM}^+)} SNR_{sc,OFDM}.$$

When the channel is not AWGN but follows a flat fading Rayleigh distribution, the above expressions must be changed to account for the statistical variations of the signal amplitude. The subcarrier SNR can still be written as $$SNR_{sc,freq,FM} = 2\pi^2 m_{norm}^2 \frac{E\left[\frac{1}{|x[n]|_{max}^2}\right]}{E\left[\arctan^2 \frac{n_{0,\theta}[n]}{A_c[n] + n_{0,r}[n]}\right]} \frac{1}{\eta(N_{a,FM}^+)}.$$

Taking into account that the amplitude $A_c$ now follows a Rayleigh distribution:

$$p(A_c) = \frac{A_c}{\sigma^2} \exp\left(-\frac{A_c}{2\sigma^2}\right),$$

where $\sigma^2$ is the average power of the signal's amplitude, it is possible to calculate the term in the denominator by means of the expression:

$$E\left[\arctan^2 \frac{n_{0,\theta}[n]}{A_c[n] + n_{0,r}[n]}\right] =$$

$$\frac{1}{\pi N_0 B \sigma^2} \int\int\int \arctan^2 \frac{n_{0,\theta}}{A_c + n_{0,r}} \exp\left(-\frac{n_{0,\theta}^2}{N_0 B}\right)$$

$$\exp\left(-\frac{n_{0,r}^2}{N_0 B}\right) A_c \exp\left(-\frac{A_c^2}{2\sigma^2}\right) dn_{0,\theta} dn_{0,r} dA_c.$$

This expression can also be obtained by means of Monte Carlo or numerical integration, as a function of the symbol SNR.

The presence of phase unwrap errors must however be taken into account as they can be present in a significant number of FM-OFDM symbols.

Theoretical SNR in FM-OFDM Waveform Considering Phase Unwrap Errors

Phase unwrap errors are caused by ambiguities in the phase of the received signal caused by channel impairments. Assuming that two consecutive signal samples have a phase difference $\Delta\varphi$, phase ambiguity will occur upon reception whenever noise forces $\Delta\varphi$ to go from $-\pi$ to $\pi$ or vice versa. In the instantaneous frequency spectrum, assuming that $n_0$ is the time instant when a phase unwrap error is produced, it gives rise to an additive term of the form:

$$\pm \frac{1}{\sqrt{N}} \exp(-j2\pi k n_0/N),$$

which is added to the subcarrier's complex information. Mathematically, phase unwrap errors are caused by the presence of multiple branches in the complex arctan function.

This error could be ideally detected at the receiver (130) by estimating the presence of a progressive phase term on the unused subcarriers, namely those with indices above $k_0+N_{a,FM}^+$. Estimation of the slope in this progressive phase would allow proper reconstruction and further subtraction of the phase unwrap error term, subject to thermal noise and estimation errors.

Given that the power of the phase unwrap error term is $1/N$, such error increases the total noise power in the subcarriers of the instantaneous frequency signal. At each FM-OFDM sample there is a probability that the instantaneous frequency yields a phase unwrap error, P[unwrap], given by:

$$P[\text{unwrap}]=P[|f+\Delta f|\geq 0.5].$$

This is the probability that the received instantaneous frequency (including the error term $\Delta f$ introduced by noise) exceeds 0.5. The average number of time instants where a phase unwrap error is produced within an FM-OFDM symbol is equal to N·P[unwrap], and the average power of the phase unwrap errors, N·P[unwrap]/N Hence the noise power including the effect of phase unwrap errors can be written as:

$$N_{sc,freq,FM}^{unwrap} = \frac{1}{2\pi^2} E\left[\arctan^2 \frac{n_{0,\theta}[n]}{A_c[n]+n_{0,r}[n]}\right] \eta(N_{a,FM}^+) + P[\text{unwrap}].$$

P[unwrap] can be obtained numerically from the probability density function of the instantaneous frequency $(f+\Delta f)[n]$, taking into account that $p_{f+\Delta f}(f)=(p_f * p_{\Delta f})(f)$, and the probability distribution $p_{\Delta f}(\cdot)$ can be obtained as a transformation of $n_{0,\theta}$, $n_{0,r}$ and $A_c$. Therefore:

$$P[\text{unwrap}] = \int_{0.5}^{1} [p_f(f) * p_{\Delta f}(f)] df + \int_{-1}^{-0.5} [p_f(f) * p_{\Delta f}(f)] df.$$

The subcarrier SNR, taking into account phase unwrap errors, will be given by the expression:

$$(SNR_{sc,freq,FM}^{unwrap})^{-1} \equiv \frac{N_{sc,freq,FM}^{unwrap}}{S_{sc,freq,FM}} = (SNR_{sc,freq,FM})^{-1} + \frac{P[\text{unwrap}]}{m_{norm}^2 E\left[\frac{1}{|x[n]|_{max}^2}\right]}.$$

This allows to determine the exact number of active subcarriers required for a given SNR gain over the OFDM case, for a given modulation order.

All the above theoretical calculations can be complemented by link-level simulations where all mentioned effects can be present so as to yield BER/BLER performance curves. These curves can be used to select the waveform parameters that yield a desired SNR gain over prior-art techniques.

Figure 7:
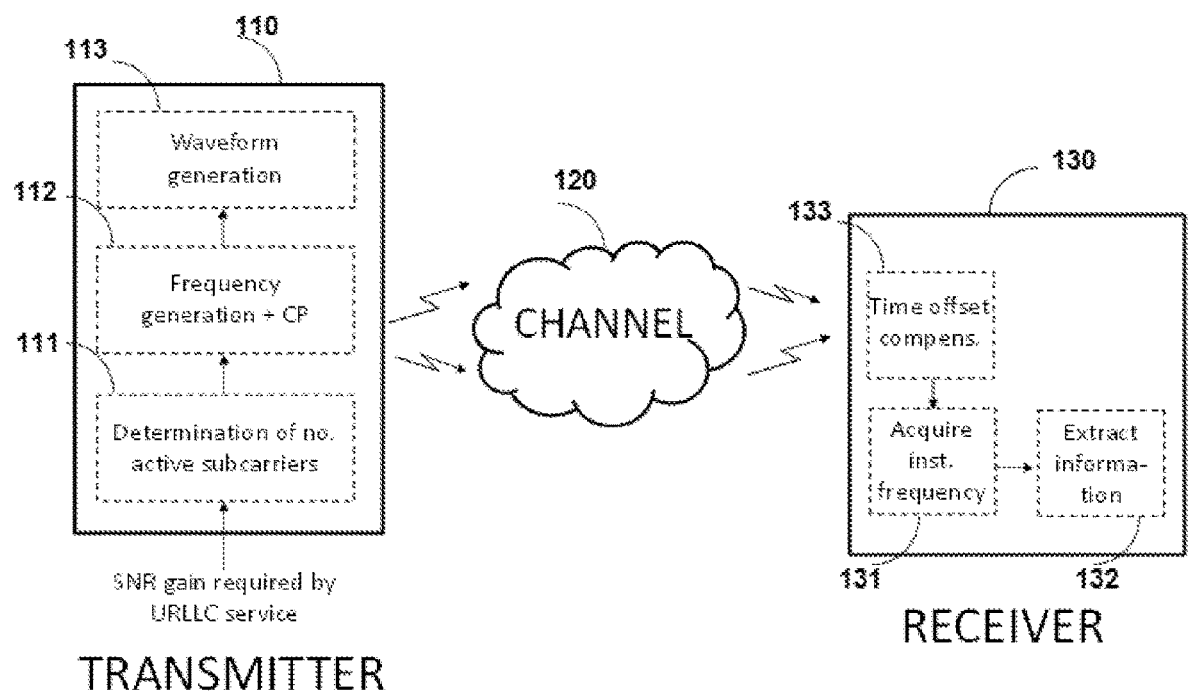
FIG. 7 illustrates another schematic illustration of the system for implementing the proposed invention.

With reference now to FIG. 7, therein it is illustrated another embodiment of the system for application of the proposed method. The transmitter (110) first determines the number of active subcarriers (block 111) from the expected SNR gain that is required by the URLLC service under consideration. Block 112 then generates the instantaneous frequency signal which, together with the cyclic prefix, forms the basis of the waveform generation block (113). The resulting FM-OFDM signal passes through the channel (120), which is assumed to have flat fading conditions, and reaches the receiver (130). A time offset compensation block (133) copes with any time synchronization errors resulting from the detection process, and block (131) acquires the instantaneous frequency signal carrying the information. Finally, block (132) is able to extract the information from the active subcarriers.

The proposed invention can be implemented by means of software elements, hardware elements, firmware elements, or any suitable combination of them. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

As used herein, computer program products comprising computer-readable media including all forms of computer-readable medium except, to the extent that such media is deemed to be non-statutory, transitory propagating signals.

The present invention can be applicable for wireless communications where Doppler and/or phase noise impairments can be very significant, such as those in high-speed wireless applications or at very high frequencies, where the oscillators can exhibit large phase noise. Suitable estimation of the cutoff subcarrier $k_0$ for the desired operating conditions can ensure that no significant Doppler, phase noise and CFO impairments will corrupt the information. Channel estimation and time synchronization to the multipath components can be achieved via CAZAC sequences with good correlation properties. Subcarriers for time offset estimation, and a cyclic prefix appended to the complex baseband signal, can also be included to allow equalization and cope with any time synchronization errors. The constant envelope nature of the complex baseband signal makes it ideal for use in transmitters having non-linear power amplifiers with no or very little back-off.

The scope of the present invention is defined in the following set of claims.

REFERENCES

[1] Patent Application EP16382303.2, "A method to generate a wireless waveform for use in a wireless communication system, a wireless communication system and computer program products thereof", June 2016.

[2] Stanford University Lecture Notes on Angle Modulation, II, available for download at: http://web.stanford.edu/class/ee179/restricted/slides09.pdf

The invention claimed is:

1. A method to provide increased robustness against noise and interference in wireless communications, comprising sending, by a transmitter, to a receiver, through a wireless channel, information using a constant-envelope waveform with complex baseband representation of the form $s[n]=A_c \exp\{j\phi[n]\}$, denoted as FM-OFDM waveform, said phase $\phi[n]$ following the expression $$(\phi[n] - \phi[n-1]) = 2\pi m \cdot \sum_{k=k_0+1}^{k_0+N_{a,FM}^+ -1} x[k]\exp\left(j\frac{2\pi k n}{N}\right),$$

where N is the FFT length, $k_0$ is a cutoff subcarrier above which the information $x[k]$ is mapped, $N_{a,FM}^+$ is the number of active positive subcarriers, and $A_c$ and m are real constants, aimed at protecting the information against noise, Doppler, phase noise and carrier frequency offset impairments, wherein said wireless channel has an Additive White Gaussian Noise component and flat-fading conditions, wherein the method comprises:
calculating, by the transmitter, the FFT length, N, and the number of active positive subcarriers, $N_{a,FM}^+$, that are needed in order to have a given improvement in the signal to noise ratio at the active positive subcarriers of the instantaneous frequency spectrum containing the information;
calculating, by the transmitter, the cutoff subcarrier $k_0$ that is needed to overcome Doppler, phase noise and carrier frequency offset impairments at the receiver side; and
generating, by the transmitter, a complex baseband signal waveform of the form $s[n]=A_c \exp\{j\phi[n]\}$ carrying the desired information with the chosen FFT length, number of active positive subcarriers and cutoff subcarrier.

2. The method of claim 1, wherein said signal to noise ratio at the active positive subcarriers of the instantaneous frequency spectrum, when taking into account phase unwrap errors, $SNR_{sc,freq,FM}^{unwrap}$, follows the expression:

$$(SNR_{sc,freq,FM}^{unwrap})^{-1} = (SNR_{sc,freq,FM})^{-1} + \frac{P[\text{unwrap}]}{m_{norm}^2 E\left[\frac{1}{|x[n]|_{max}^2}\right]},$$

where the signal to noise ratio at the active positive subcarriers of the instantaneous frequency spectrum disregarding phase unwrap errors, $SNR_{sc,freq,FM}$, is given by:

$$SNR_{sc,freq,FM} = 2\pi^2 m_{norm}^2 \frac{E\left[\frac{1}{|x[n]|_{max}^2}\right]}{E\left[\arctan^2\frac{n_{0,\theta}[n]}{A_c[n]+n_{0,r}[n]}\right]} \frac{1}{\eta(N_{a,FM}^+)},$$

$$\eta(N_{a,FM}^+) = \frac{1}{N_{a,FM}^+} \sum_{k=k_0+1}^{k_0+N_{a,FM}^+} \left(1 - \cos\left(\frac{2\pi k}{N}\right)\right),$$

where $n_{0,r}[n]$ and $n_{0,\theta}[n]$ are additive White Gaussian noise components along radial and normal directions with respect to a phasor representing the received FM-OFDM signal, according to the expression:

$r[n]=(A_c[n]+n_{0,r}[n])\hat{u}_r + n_{0,\theta}[n]\hat{u}_\theta$, where $r[n]$ is the complex baseband representation of the received FM-OFDM signal; $\hat{u}_r$, $\hat{u}_\theta$ are unitary phasors in the complex plane following radial and normal directions respectively; $A_c[n]$ is the received amplitude of the FM-OFDM signal; $m_{norm}$ is the modulation index of the FM-OFDM signal obeying the expression $m=m_{norm}/(|x[n]|_{max}\cdot\sqrt{N})$, where $|x[n]|_{max}$ is the absolute peak value of the OFDM signal $x[n]$ constructed by taking $x[k]$ as the subcarriers' amplitudes;

and P[unwrap] is the probability that a phase unwrap error occurs at any instantaneous sample of the received FM-OFDM symbol.

3. The method of claim 2, wherein the magnitude $$E\left[\frac{1}{|x[n]|_{max}^2}\right]$$

being obtained by simulation as a function of $N_{a,FM}^+$ and the modulation order of the subcarriers in the instantaneous frequency, by obtaining the average of the term in brackets after a sufficiently high number of transmitted OFDM symbols with random subcarrier amplitudes $x[k]$.

4. The method of claim 2, wherein the magnitude $$E\left[\arctan^2\frac{n_{0,\theta}[n]}{A_c[n]+n_{0,r}[n]}\right]$$

being calculated as a function of the symbol signal-to-noise ratio, $$SNR_{simb,FM} = \frac{A_c^2}{N_0 B},$$

in presence of Additive White Gaussian Noise with no Rayleigh fading impairments, using the expression:

$$E\left[\arctan^2\frac{n_{0,\theta}[n]}{A_c[n]+n_{0,r}[n]}\right] =$$

$$\frac{1}{\pi N_0 B}\int\int \arctan^2\frac{n_{0,\theta}}{A_c+n_{0,r}}\exp\left(-\frac{n_{0,\theta}^2}{N_0 B}\right)\exp\left(-\frac{n_{0,r}^2}{N_0 B}\right)dn_{0,\theta}dn_{0,r},$$

where $N_0$ is the noise power spectral density and B is the signal bandwidth.

5. The method of claim 2, wherein the magnitude $$E\left[\arctan^2\frac{n_{0,\theta}[n]}{A_c[n]+n_{0,r}[n]}\right]$$

being calculated as a function of the symbol signal-to-noise ratio, $$SNR_{simb,FM} = \frac{A_c^2}{N_0 B},$$

in presence of a flat fading Rayleigh channel using the expression:

$$E\left[\arctan^2 \frac{n_{0,\theta}[n]}{A_c[n] + n_{0,r}[n]}\right] =$$

$$\frac{1}{\pi N_0 B \sigma^2} \int \int \int \arctan^2 \frac{n_{0,\theta}}{A_c + n_{0,r}} \exp\left(-\frac{n_{0,\theta}^2}{N_0 B}\right) \exp\left(-\frac{n_{0,r}^2}{N_0 B}\right)$$

$$A_c \exp\left(-\frac{A_c^2}{2\sigma^2}\right) dn_{0,\theta} dn_{0,r} dA_c,$$

where $\sigma^2$ is the average received power of the signal's amplitude $A_c[n]$.

6. The method of claim 2, wherein said probability of phase unwrap errors, P[unwrap], being expressed as the probability that the absolute magnitude of the received instantaneous frequency signal exceeds 0.5:

$$P[\text{unwrap}] = P[|f + \Delta f| \geq 0.5],$$

where f is the instantaneous frequency signal ideally received without noise, and $\Delta f$ is the corresponding noise component.

7. The method of claim 6, wherein said probability of phase unwrap errors being calculated by:

$$P[\text{unwrap}] = \int_{0.5}^{1} [p_f(f) * p_{\Delta f}(f)] df + \int_{-1}^{-0.5} [p_f(f) * p_{\Delta f}(f)] df,$$

where $p_{\Delta f}(\cdot)$ denotes the probability density function, pdf, of the instantaneous frequency noise component $\Delta f$, and $p_f(\cdot)$ denotes the pdf of the instantaneous frequency signal f ideally received without noise, according to the expression:

$$f[n] = \frac{m_{norm}}{|x[n]|_{max}} \cdot \frac{1}{\sqrt{N}} \sum_{k=0}^{N-1} x[k] \exp\left(j\frac{2\pi k n}{N}\right), n = 0, \ldots, N-1,$$

where x[k] are the subcarriers' complex amplitudes containing the information; $m_{norm}$ is the modulation index; and $|x[n]|_{max}$ is the peak absolute amplitude of the constituent OFDM signal x[n] containing the information.

8. The method of claim 7, wherein said pdf of the instantaneous frequency noise component $p_{\Delta f}(\cdot)$ can be calculated as the pdf of a transformation of the random processes $n_{0,r}[n]$, $n_{0,\theta}[n]$, and $A_c[n]$, according to the expression:

$$\Delta f[n] = \frac{1}{2\pi}\left[\arctan \frac{n_{0,\theta}[n]}{A_c[n] + n_{0,r}[n]} - \arctan \frac{n_{0,\theta}[n-1]}{A_c[n-1] + n_{0,r}[n-1]}\right].$$

9. A transmitter to provide increased robustness against noise and interference in wireless communications, said transmitter being configured to send to a receiver through a wireless channel, information using a constant-envelope waveform with complex baseband representation of the form $s[n] = A_c \exp\{j\phi[n]\}$, denoted as FM-OFDM waveform, said phase $\phi[n]$ following the expression $$(\phi[n] - \phi[n-1]) = 2\pi m \cdot \sum_{k=k_0+1}^{k_0+N_{a,FM}^+ - 1} x[k] \exp\left(j\frac{2\pi k n}{N}\right),$$

where N is the FFT length, $k_0$ is a cutoff subcarrier above which the information x[k] is mapped, $N_{a,FM}^+$ is the number of active positive subcarriers, and $A_c$ and m are real constants, aimed at protecting the information against noise, Doppler, phase noise and carrier frequency offset impairments, said wireless channel having an Additive White Gaussian Noise component and flat-fading conditions, characterized in that the transmitter comprises a waveform generation unit adapted and configured to:
calculate the FFT length, N, and the number of active positive subcarriers, $N_{a,FM}^+$, that are needed in order to have a given improvement in the signal to noise ratio at the active positive subcarriers of the instantaneous frequency spectrum containing the information;
calculate the cutoff subcarrier $k_0$ that is needed to overcome Doppler, phase noise and carrier frequency offset impairments at the receiver side; and
generate a complex baseband signal waveform of the form $s[n] = A_c \exp\{j\phi[n]\}$ carrying the desired information with the chosen FFT length, number of active positive subcarriers and cutoff subcarrier.

10. A computer program product including code instructions that when executed in a computer implement the steps of the method of claim 1.

* * * * *